Figure 1:
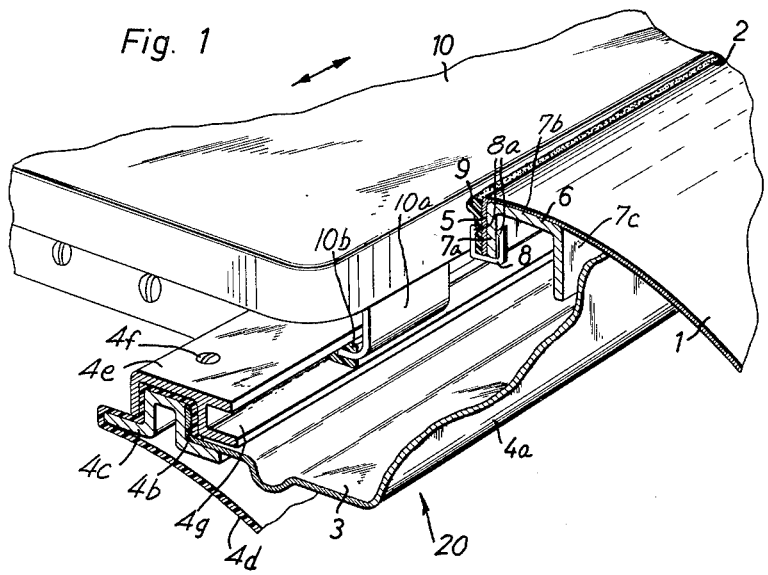

Dec. 4, 1962  H. REHMANN  3,066,976
SUPPORT FRAME ARRANGEMENT FOR A SLIDABLE VEHICLE ROOF PANEL
Filed Nov. 23, 1959

Inventor
Heinrich Rehmann
BY
Michael S. Striker
Attorney 3,066,976
SUPPORT FRAME ARRANGEMENT FOR A
SLIDABLE VEHICLE ROOF PANEL
Heinrich Rehmann, Stockdorf, Munich, Germany, assignor to Wilhelm Baier K.G., Stockdorf, near Munich, Germany
Filed Nov. 23, 1959, Ser. No. 854,628
Claims priority, application Germany Nov. 22, 1958
4 Claims. (Cl. 296—137)

The present invention relates to a support frame arrangement.

More particularly, the present invention relates to a support frame arrangement for slidably supporting a rigid roof panel of a vehicle.

There exist support frame arrangements in which the stationary part of the roof partially overlies a rain gutter which is located beneath the juncture of the stationary part and the roof panel. In this way, part of the rain gutter, which must be of a certain minimum width, is beneath the stationary part of the roof, so that the opening which is covered and uncovered by the slidable roof panel may be larger than if the rain gutter in its entirety were located outwardly of the edge of the stationary part. These known arrangements, however, have the disadvantage that it is difficult to provide and mount either sealing means or reinforcements. Also, the known constructions are relatively complicated and thus raise the cost of vehicles having slidably supported rigid roof panels.

It is therefore an object of the present invention to provide a support frame arrangement which overcomes the above disadvantages.

It is another object of the present invention to provide a support frame arrangement which is easily constructed.

The objects of the present invention also include the provision of a support frame arrangement which is especially adapted to have sealing means mounted on it, which sealing means are effective between the stationary part of the roof and the slidable roof panel.

With the above objects in view, the present invention resides mainly in that improvement in a support frame arrangement for slidably supporting a rigid roof panel of a vehicle, which comprises a rain gutter, and means forming a stationary part of the roof which part together with the slidably supported roof panel forms the roof of the vehicle, these means having an edge portion which overlaps the rain gutter and which is formed with a downwardly depending flange portion spaced from the bottom of the rain gutter. It is thanks to this flange that the sealing means as well as suitable reinforcements may be attached easily and economically to the stationary part of the roof.

Figure 2:
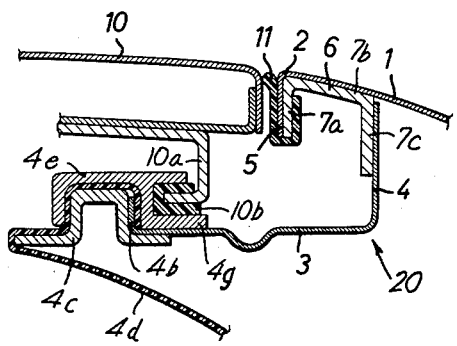

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a perspective view, partly in section, of one embodiment of the present invention; and FIG. 2 is a sectional view of a modified embodiment of the present invention.

Referring now to the drawing and to FIG. 1 thereof in particular, there is shown a roof structure incorporating a stationary part 1 of sheet metal and a rigid roof panel 10. Beneath the juncture of the part 1 and the panel 10 there is a rain gutter 20 having a bottom 3 and two upstanding side walls 4a and 4b. The side wall 4b carries an inverted channel-shaped flanged reinforcement 4c to which is secured the material 4d which runs to the inside of the vehicle. This material is held in place by another channel member 4e which is screwed to the reinforcement 4c by screws 4f, and this channel member forms a guide rail 4g adapted to receive the legs 10a (only one of which is shown) on one side of the panel 10. A suitable anti-friction liner 10b is shown being carried by the leg 10a. In this way the panel 10 is slidably supported for movement in the direction indicated by the arrow.

The stationary part 1 is formed with a substantially horizontal edge portion 2 which overlaps the rain gutter 20 and which has a downwardly directed flange 5. As is clearly shown in the drawing, this flange is directed but a relatively short distance toward the bottom 3, so as to be spaced therefrom.

The stationary part 1 is reinforced by a reinforcement 6 which is part of a reinforcing frame and is shown as being of inverted U-shaped cross-section having legs 7a and 7c and a base 7b. The leg 7a is a generally vertical portion which is adjacent the flange 5 and the base 7b is a horizontal portion adjacent the horizontal edge portion 2. The leg 7a is secured to the flange 5 such as by welding, preferably spot-welding. The other leg 7c is adjacent to the upstanding side wall 4a of the rain gutter 20.

The flange carries a sealing means in the form of an elongated stripping 9 of wool plush which is arranged on that side of the flange which is directed toward the roof panel 10 so as to seal the space between the stationary part of the roof and the slidable panel. The stripping 9 is attached to the flange 5 at a plurality of spaced points by a plurality of spaced U-shaped retaining clips 8. In order to increase the efficacy of the clips, they are formed at their free ends with inwardly directed engaging teeth 8a.

The embodiment illustrated in FIG. 2 differs from that of FIG. 1 only insofar as the sealing means and their retaining means are concerned, so that except for this feature, the same reference numerals are used as appear in FIG. 1 to represent the same parts. Thus, the embodiment of FIG. 2 shows a sealing strip 11 which is of U-shaped cross-section and which encompasses the flange 5 as well as the leg 7a of the reinforcement 6. This sealing strip 11 may be slipped over the flange 5 and leg 7a and be held in place either by its own resilient clamping action, or by clamping means, or it may be held in place by a suitable adhesive. Alternatively, any other type of fastening may be used for the sealing strip 11 of this embodiment, or for the strip 9 of the embodiment shown in FIG. 1.

It will be seen from the above that thanks to the downwardly depending flange 5 both the sealing means as well as the reinforcement 6 may be attached easily and economically to the stationary part of the vehicle roof. The attachment of the reinforcement 6 is simple inasmuch as the flange 5 is readily accessible for spot-welding. Nor is it necessary to work the spot-welds because they are no longer visible on the outside, being either covered up by sealing strip or else being at an interior location. Furthermore, when the rain gutter is attached, it is no longer necessary to form the frame made up by the reinforcement 6 with a 180° flange.

It will be understood that each of the elements described above, or two or more together, may also find a useful application in other types of support frame arrangements differing from the types described above.

While the invention has been illustrated and described as embodied in a support frame arrangement for slidably supporting a rigid roof panel of a vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a support frame arrangement for slidably supporting a rigid roof panel of a vehicle, the combination which comprises: a rain gutter; means forming a stationary part of the roof which part together with the slidably supported roof panel forms the roof of the vehicle, said means having a substantially horizontal edge portion which overlaps said rain gutter and which is formed with a downwardly depending flange portion spaced from the bottom of said rain gutter; and a reinforcement having a pair of spaced end portions, at least one of which is substantially vertical and a substantially horizontal portion between said end portions, said vertical end portion abutting against and being secured to said flange and said horizontal portion abutting against said substantially horizontal edge portion of said means without being secured thereto, and said rain gutter being secured to the other of said end portions of said reinforcement.

2. In a support frame arrangement for slidably supporting a rigid roof panel of a vehicle, the combination which comprises: a rain gutter; means forming a stationary part of the roof which part together with the slidably supported roof panel forms the roof of the vehicle, said means having a substantially horizontal edge portion which overlaps said rain gutter and which is formed with a downwardly depending flange portion spaced from the bottom of said rain gutter; and a reinforcement having a pair of spaced end portions, at least one of which is substantially vertical and a substantially horizontal portion between said end portions, said vertical end portion abutting against and being welded to said flange and said horizontal portion abutting against said substantially horizontal edge portion of said means without being secured thereto, and said rain gutter being secured to the other of said end portions of said reinforcement.

3. In a support frame arrangement for slidably supporting a rigid roof panel of a vehicle, the combination which comprises: a rain gutter; means forming a stationary part of the roof which part together with the slidably supported roof panel forms the roof of the vehicle, said means having an edge portion which overlaps said rain gutter and which is formed with a downwardly depending flange portion, spaced from the bottom of said rain gutter, a reinforcement having a pair of spaced end portions at least one of which is substantially vertical and a center portion extending between said end portions, said vertical end portion abutting against and being secured to the face of said flange directed away from the slidably supported rigid roof panel and said center portion abutting against said edge portion of said means without being secured thereto, and said rain gutter being secured to the other of said end portions of said reinforcement; and sealing means arranged on the other side of said flange, said sealing means being in the form of elongated stripping attached to said flange at a plurality of spaced points by a plurality of spaced U-shaped retaining clips.

4. In a support frame arrangement for slidably supporting a rigid roof panel of a vehicle, the combination which comprises: a rain gutter; means forming a stationary part of the roof which part together with the slidably supported roof panel forms the roof of the vehicle, said means having a substantially horizontal edge portion which overlaps said rain gutter and which is formed with a downwardly depending flange portion spaced from the bottom of said rain gutter; a reinforcement of inverted U-shaped cross section, one leg of said reinforcement being secured to said flange and the other leg being secured to said rain gutter and the portion of the U-shaped reinforcement between the legs thereof remaining unsecured to said substantially horizontal edge portion of said means; and a sealing strip of U-shaped cross-section encompassing said flange and said one leg of said reinforcement.

References Cited in the file of this patent

UNITED STATES PATENTS

| | | |
|---|---|---|
| 2,273,684 | Bailey | Feb. 17, 1942 |
| 2,482,429 | Mobbs et al. | Sept. 20, 1949 |
| 2,661,234 | Bishop | Dec. 1, 1953 |
| 2,746,103 | Bright | May 22, 1956 |
| 2,756,468 | Bright | July 31, 1956 |

FOREIGN PATENTS

| | | |
|---|---|---|
| 327,563 | Switzerland | Mar. 15, 1958 |